United States Patent
Saklikar et al.

(10) Patent No.: US 11,233,742 B2
(45) Date of Patent: Jan. 25, 2022

(54) NETWORK POLICY ARCHITECTURE

(71) Applicant: Cisco Technology, Inc., San Jose, CA (US)

(72) Inventors: Samir Dilipkumar Saklikar, Milpitas, CA (US); Jayaraman Iyer, Sunnyvale, CA (US); Robin Edgard Martherus, Gilbert, AZ (US); Morteza Ansari, Newark, CA (US); Jyoti Verma, Saratoga, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/674,693

(22) Filed: Nov. 5, 2019

(65) Prior Publication Data

US 2021/0135995 A1 May 6, 2021

(51) Int. Cl.
*H04L 12/813* (2013.01)
*H04L 12/24* (2006.01)
*H04L 12/26* (2006.01)
*H04L 29/08* (2006.01)

(52) U.S. Cl.
CPC .......... *H04L 47/20* (2013.01); *H04L 41/0893* (2013.01); *H04L 43/08* (2013.01); *H04L 67/10* (2013.01)

(58) Field of Classification Search
CPC ..... H04L 63/20; H04L 47/20; H04L 41/0893; H04L 43/08
See application file for complete search history.

(56) References Cited

U.S. PATENT DOCUMENTS

| | | | |
|---|---|---|---|
| 9,455,991 B2 | 9/2016 | Grigoriev et al. |
| 9,641,540 B2 | 5/2017 | Dotan et al. |
| 9,787,722 B2 | 10/2017 | Knjazihhin et al. |
| 9,894,101 B2 | 2/2018 | Hendrick et al. |
| 9,948,679 B2 | 4/2018 | Siswick et al. |

(Continued)

OTHER PUBLICATIONS

Knjazihhin, Denis et al., "Multi Tenancy Architecture to Isolate Tenant Databases in Network Security Management System", https://priorart.ip.com/IPCOM/000243708, Oct. 14, 2015, 8 pages.

(Continued)

*Primary Examiner* — Andrew C Georgandellis
(74) *Attorney, Agent, or Firm* — Edell, Shapiro & Finnan, LLC

(57) ABSTRACT

One or more lower-level attributes of a first network policy are translated to one or more higher-level attributes of the first network policy, and one or more lower-level attributes of a second network policy are translated to one or more higher-level attributes of the second network policy. The first network policy controls how first network traffic is handled, and the second network policy controls how second network traffic is handled. The one or more higher-level attributes of the first network policy are compared with the one or more higher-level attributes of the second network policy. Based on the comparing, it is determined whether the first network traffic and the second network traffic are handled in a functionally equivalent manner. If not, the first network policy is dynamically updated to generate an updated first network policy that causes the first network traffic to be handled in the functionally equivalent manner.

20 Claims, 5 Drawing Sheets

(56) References Cited

U.S. PATENT DOCUMENTS

| | | |
|---|---|---|
| 9,992,232 B2 | 6/2018 | Hollingshead et al. |
| 10,033,766 B2 | 7/2018 | Gupta et al. |
| 10,050,842 B2 | 8/2018 | Salam et al. |
| 10,075,439 B1 | 9/2018 | Mullens et al. |
| 10,110,632 B2 | 10/2018 | Li et al. |
| 10,129,100 B2 | 11/2018 | Hinrichs et al. |
| 10,182,055 B2 | 1/2019 | Lawrence et al. |
| 2007/0157286 A1* | 7/2007 | Singh ................. H04L 41/0893 726/1 |
| 2008/0320550 A1* | 12/2008 | Strassner ............ H04L 63/0263 726/1 |
| 2016/0088049 A1 | 3/2016 | Seed et al. |
| 2016/0105305 A1 | 4/2016 | Pignataro et al. |
| 2017/0155562 A1 | 6/2017 | Vasant et al. |
| 2017/0317999 A1 | 11/2017 | Knjazihhin et al. |
| 2018/0159899 A1 | 6/2018 | Sward et al. |
| 2018/0375887 A1 | 12/2018 | Dezent et al. |
| 2019/0007418 A1* | 1/2019 | Cook .................... H04L 63/108 |

OTHER PUBLICATIONS

Cisco Systems, Inc., "CPS Wi-Fi Configuration Guide, Release 10.0.0", Jul. 8, 2016, 234 pages.

Mabrouki, Olfa, "Semantic Framework for Managing Privacy Policies in Ambient Intelligence", HAL Id: tel-01141997, https://tel.archives-ouvertes.fr/tel-01141997, Apr. 14, 2015, 164 pages.

* cited by examiner

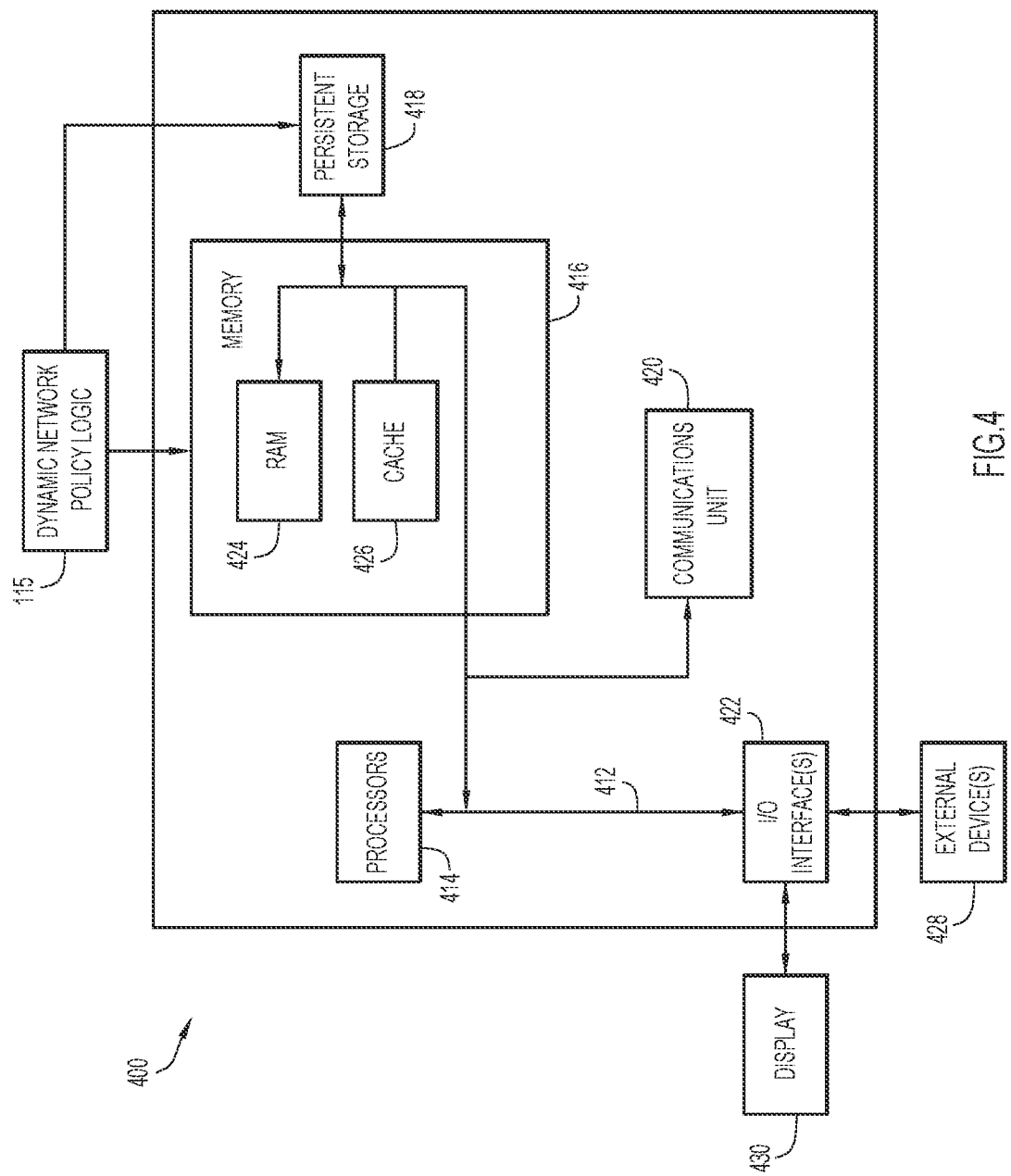

500

510 — TRANSLATE ONE OR MORE LOWER-LEVEL ATTRIBUTES OF A FIRST NETWORK POLICY TO ONE OR MORE HIGHER-LEVEL ATTRIBUTES OF THE FIRST NETWORK POLICY, WHEREIN THE FIRST NETWORK POLICY CONTROLS HOW FIRST NETWORK TRAFFIC IS HANDLED

520 — TRANSLATE ONE OR MORE LOWER-LEVEL ATTRIBUTES OF A SECOND NETWORK POLICY TO ONE OR MORE HIGHER-LEVEL ATTRIBUTES OF THE SECOND NETWORK POLICY, WHEREIN THE SECOND NETWORK POLICY CONTROLS HOW SECOND NETWORK TRAFFIC IS HANDLED

530 — COMPARE THE ONE OR MORE HIGHER-LEVEL ATTRIBUTES OF THE FIRST NETWORK POLICY WITH THE ONE OR MORE HIGHER-LEVEL ATTRIBUTES OF THE SECOND NETWORK POLICY

540 — BASED ON THE COMPARING, DETERMINE WHETHER THE FIRST NETWORK TRAFFIC AND THE SECOND NETWORK TRAFFIC ARE HANDLED IN A FUNCTIONALLY EQUIVALENT MANNER

550 — IF IT IS DETERMINED THAT THE FIRST NETWORK TRAFFIC AND THE SECOND NETWORK TRAFFIC ARE NOT HANDLED IN A FUNCTIONALLY EQUIVALENT MANNER, DYNAMICALLY UPDATE THE FIRST NETWORK POLICY TO GENERATE AN UPDATED FIRST NETWORK POLICY THAT CAUSES THE FIRST NETWORK TRAFFIC TO BE HANDLED IN THE FUNCTIONALLY EQUIVALENT MANNER

FIG.5

NETWORK POLICY ARCHITECTURE

TECHNICAL FIELD

The present disclosure relates to network policies.

BACKGROUND

A network policy controls whether/how network traffic can travel to or from various points in a network. A network policy architecture ensures that network policies are correctly managed, distributed, and enforced within the network. In particular, network policy architectures are generally configured for administration (network policy management), decision-making (evaluation and authorization), and enforcement (carrying out network policies).

BRIEF DESCRIPTION OF THE DRAWINGS

FIG. 4 illustrates a block diagram of a computing device configured to dynamically change network policies, according to an example embodiment.

FIG. 5 illustrates a flowchart of a method for dynamically changing network policies, according to an example embodiment.

DESCRIPTION OF EXAMPLE EMBODIMENTS

Overview

Figure 1:
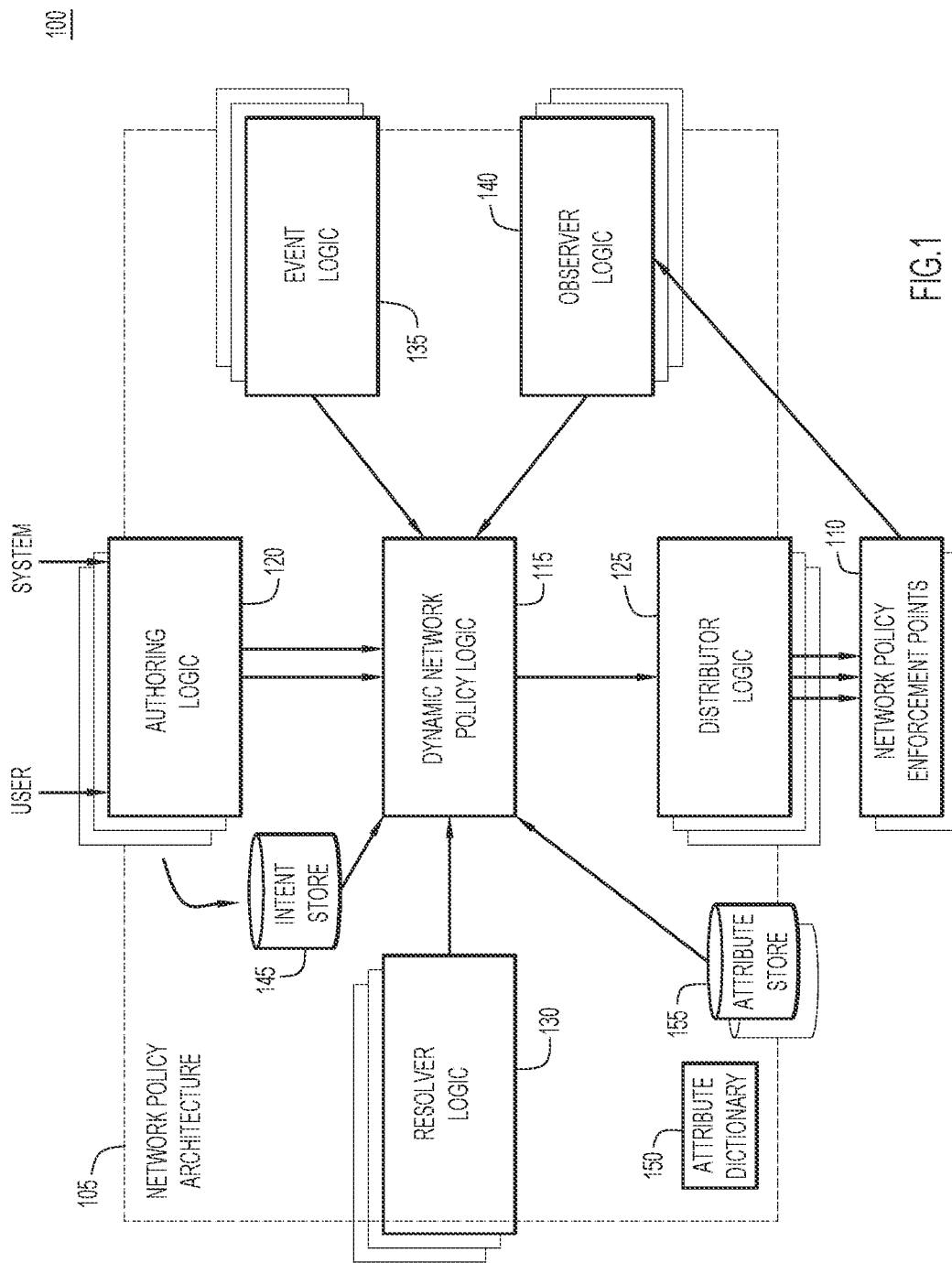
FIG. 1 illustrates a system that includes a network policy architecture configured to dynamically change network policies, according to an example embodiment.

In one example embodiment, a method is provided that includes translating one or more lower-level attributes of a first network policy to one or more higher-level attributes of the first network policy, and translating one or more lower-level attributes of a second network policy to one or more higher-level attributes of the second network policy. The first network policy controls how first network traffic is handled, and the second network policy controls how second network traffic is handled. The method includes comparing the one or more higher-level attributes of the first network policy with the one or more higher-level attributes of the second network policy. Based on the comparing, the method includes determining whether the first network traffic and the second network traffic are handled in a functionally equivalent manner. If it is determined that the first network traffic and the second network traffic are not handled in a functionally equivalent manner, the method includes dynamically updating the first network policy to generate an updated first network policy that causes the first network traffic to be handled in the functionally equivalent manner.

Example Embodiments

Existing network policy architectures are typically configured to change a network policy in response to instructions from a user (e.g., network administrator, person with limited technical knowledge, etc.). However, users cannot recognize every scenario in which a network policy architecture should be instructed to change a network policy. In fact, users often only instruct a network policy architecture to change a network policy when the actual network policy decision or enforcement needs to be changed (e.g., to allow a previously disallowed action). However, there are countless scenarios in which network policies need to be dynamically modified to ensure appropriate network communication within the network. Some such example scenarios are provided below.

In one scenario the network environment may change. For example, in hybrid network environments that include on-premise resources and cloud-based resources, workloads can move dynamically between on-premise and cloud network environments. Different network environments can have different inherent network policy enforcement capabilities with possible duplicity. Existing network policy architectures cannot adapt to these changing network environments.

Another scenario may involve changes to the security posture of a device, an application, a server, etc. Security posture can change drastically based on how often new third-party software or applications are installed on a device/server with or without the consent of the primary application. Similarly, the security posture of a mobile device can change based on when/how the mobile device moves within different networks or new applications are installed. Existing network policy architectures cannot reassess the network policy structure in view of these changes to security posture.

In still another scenario, compliance requirements for the underlying system can evolve or change based on where the system moves or chooses to store data. Existing network policy architectures cannot adapt the underlying system network policies to these compliance changes to ensure that these underlying changes do not result in those network polices becoming non-compliant. Existing network policy architectures also cannot protect an application that is adapted to support new data-driven compliance requirements. Often these compliance requirements can also be highly dependent on the data that is being processed by the application, but existing network policy architectures do not categorize new types of data handled by the application under a new set of compliance requirements.

In yet another scenario, network policies are often authored with the goal of satisfying a given user intent. The underlying enforcement requirements to satisfy this intent may evolve over time and/or change based on one or more of the aforementioned scenarios. Existing network policy architectures cannot evolve a network policy structure to ensure the intent is consistent. For example, an existing network policy architecture cannot evolve a network policy relating to vulnerability as new vulnerabilities are discovered.

Furthermore, in certain multi-domain environment scenarios, network policies are authored in specific constructs for each domain. Assuring that the network policies are being enforced correctly is impossible, or at least extremely challenging, for existing network policy architectures. Any assurance provided by the existing network policy architectures is a point-in-time mechanism. Furthermore, network policies authored and deployed for existing network policy architectures require an out-of-band approach to validate whether network policies are being enforced correctly. Existing network policy architectures do not provide an integrated network policy system that can provide continuous assurance across multiple domains.

In still other scenarios, once a network policy decision has been made it is assumed that the network policy will be enforced correctly. However, this is not always a sound assumption. For example, due to actual enforcement errors, dynamic network changes or network topography enforcement decisions made at one network node may be overridden at another network node. Existing network policy architectures cannot obtain feedback regarding enforcement errors and make suitable network policy changes to delete or modify the enforcement network policies while still satisfying the overall intent of the network policy.

Some scenarios restrict users to a predefined network policy intent vocabulary, which is then translated to a set of network policies for the specific set of underlying network policy enforcement points. Existing network policy architectures are not adaptable or extensible to support a purely user-defined intent vocabulary without additional code changes to the core of the network policy architectures.

Moreover, there is a constant evolution of security products whose security functionalities are integrated to provide improved user results. This constant innovation usually results in new security products with respective network policy enforcement capabilities. Adding such new network policy enforcement capabilities to an existing network policy architecture/network policy enforcement points can involve significant integration efforts. For example, developers might need to learn the new structures and code-specific Application Programming Interface (API) integrations. Most of these limitations stem from a lack of a common standardized semantic structure to express any network policy capability structure in existing network policy architectures.

Thus, existing network policy architectures are unable to sufficiently automatically change/adapt a given network policy to handle an evolving infrastructure. For example, existing network policy architectures use pre-defined network policy definition dictionaries which restrict users from utilizing a richer set of terms for network policy definition. Most network policy constructs revolve around the specific network policy enforcement mechanism (e.g., source Internet Protocol (IP) address, destination IP address, port, protocol for firewall network policies, etc.).

In addition, existing network policy architectures translate network policies from one format to another based on built-in code. This process is static, and occurs without due consideration for the dynamic characteristics of the network environment (e.g., workload environment changes, posture changes, etc.). Without the ability to factor in new/additional information, it is difficult to prove that there is consistency with the network policy before and after the change to the network environment.

Existing network policy architectures also suffer from a lack of feedback. Such frameworks do not focus on enforcement errors, and if any are discovered, they are deemed to be due to network policy authoring errors rather than decision or translation errors. This assumption may hold true in single-domain workloads where the network policy was sourced from a particular administrator, but in hybrid workload environments, it may not be possible to trace the source of network policy because it may have originated and later transformed due to the changing network environment. In such cases, there is no feedback from the network policy decision/enforcement entities to enable automated correction of network policy translation errors.

Thus, existing network policy architectures cannot, for example, dynamically change network/contextual criteria or compliance requirements, provide automated remediation against network incidents, etc. The static nature of existing network policy architectures requires users to accurately anticipate and respond to the numerous, complex, and sometimes unpredictable scenarios that arise during the course of network policy architecture management. This is an unreasonable burden on the user and can lead to network security failures, increased latency, and other poor outcomes.

Accordingly, described herein is a programmable and data-driven network policy architecture capable of supporting a generalized, flexible, and adaptable approach to network policy definition, decision, distribution, and enforcement. In order to maintain the appropriate network policy as various factors change over time, the network policy architecture may support intent-based network policies. An intent-based network policy may be a network policy authored with one or more higher-level attributes/network policy objects. Higher-level attributes may be used to generate lower-level attributes/network policy objects for more detailed and specific network policies. Intent-based network policies may include network policies that need to be enforced directly in the network (e.g., network policies that block vulnerable applications) or network policies that act as guiding network policies and affect the directly-enforced network policies (e.g., compliance-based network policies that affect all other network policies in the network policy architecture). The following example illustrates what an intent-based network policy is and why an intent-based network policy may be used.

Consider a firewall Access Control List (ACL) which has a network policy blocking any network traffic having a source IP address of 192.168.1.1 and a destination IP address of 10.10.1.1. In this example, the specific IP addresses are lower-level attributes. This particular network policy may not be properly applied to other firewalls because the respective interface subnetworks of the firewalls may differ, and as such the other firewalls may not be able to accurately process the IP addresses specified in the network policy. Higher-level attributes, by contrast, may allow for a more generic version of this network policy that can be used on the other firewalls, even if they have different interface subnetworks. For instance, if IP address 192.168.1.1 corresponds to an internal router and IP address 10.10.1.1 corresponds to an external router, the network policy using the higher-level attributes may block any network traffic having a source IP address of an internal router and a destination IP address of an external router. In this example, the higher-level attributes may be placeholders for IP addresses of an internal router and an external router (e.g., "internalRouterIP" and "externalRouterIP"). These higher-level attributes may be dynamic and may be resolved locally at run-time by the ACL.

Thus, a higher-level attribute (e.g., "internalRouterIP") may add one layer of abstraction to a lower-level attribute (e.g., 192.168.1.1). Similarly, an intent-based network policy may enable additional layers of abstraction to network policies of lower-level attributes. The result of a network policy with higher-level attributes may be the same as a network policy with corresponding lower-level attributes, but the purpose (or intent) of the network policy with higher-level attributes may be more easily understood by a user. A network policy may be considered "intent-based" when the level of abstraction is such that a user without specific knowledge of the language of a network policy for a given product can understand the purpose (or intent) of the network policy. The network policy architecture described herein may enable use of higher-level attributes by adding one or more layers of abstraction to make network policies easier for a user to understand.

Higher-level attributes may be associated with one or more lower-level attributes by grouping multiple lower-level attributes as a higher-level attribute. The network policy architecture may create a network policy with higher-level attributes (e.g., an intent-based network policy) or a network policy with lower-level attributes, although the intent-based network policy may be more easily understood by a user. Lower-level attributes may be removed or added from a group corresponding to a higher-level attribute without changing the associated intent-based network policy.

In one example, a higher-level attribute called "Web Server" may be created by combining the lower-level attributes "port=80 or port=443," "protocol=http," and "process=https". The intent-based network policy may read, for example, "source WebServer to destination DBServer is blocked." This higher-level attribute may be used by less technical network administrators to enact network policies without needing to understand the details regarding how a web server is defined. In another example, a higher-level attribute called "trustedDevice" may be created by combining lower-level attributes identifying trusted devices. An intent-based network policy may, for example, grant any trusted device access to resources.

In one example use case, an identity management product may be registered with the network policy architecture. This may allow identity attributes, device posture attributes, and other attributes to become available to the network policy architecture for use in a network policy. The number of possible attributes may grow with the number of new device types or products that are added to the network policy architecture, allowing a user to create ever-richer network policies. It will be appreciated that any number of levels of attributes may be used.

With reference made to FIG. 1, shown is an example system 100 configured for dynamically changing network policies. System 100 includes network policy architecture 105 and one or more network policy enforcement points 110. Network policy architecture 105 includes dynamic network policy logic 115, which causes network policy architecture 105 to perform operations for automatically and dynamically updating network policies. For example, dynamic network policy logic 115 may translate higher-level attributes in an intent domain to lower-level attributes that can be understood/actionable by one or more network nodes (e.g., routers, switches, firewalls, etc.). Network policy architecture 105 also includes other logical components to assist dynamic network policy logic 115 in performing operations described herein. These logical components include authoring logic 120, distributor logic 125, resolver logic 130, event logic 135, and observer logic 140. Network policy architecture 105 further includes intent store 145, attribute dictionary 150, and attribute store 155. It will be appreciated that intent store 145 and attribute store 155 may comprise one or more stores/databases/repositories/etc.

Briefly, authoring logic 120 may obtain network policies from a user and/or other network policy management systems (e.g., a network security orchestrator) and provide a higher-level attribute-based network policy structure to dynamic network policy logic 115. Dynamic network policy logic 115 may translate the (intent-based) higher-level attributes to (enforceable) lower-level attributes, generate a compiled network policy that includes the lower-level attributes and is actionable by one or more network nodes, and provide the compiled network policy to distributor logic 125. Distributor logic 125 may schematically translate the compiled network policy structure to a network policy format that can be understood by one or more network policy enforcement points 110, and provide the schematic translation to one or more network policy enforcement points 110.

Resolver logic 130 may obtain additional information for network policy compilation from external networks and provide that information to dynamic network policy logic 115. Event logic 135 may obtain raw events from the network and trigger dynamic network policy logic 115 to perform on-demand network policy compilation/distribution based on the raw network events. Observer logic 140 may monitor enforcement decisions, efficacy, and errors in network policy enforcement by network policy enforcement points 110 and provide feedback to dynamic network policy logic 115. Intent store 145 may include information regarding one or more guardrails that relate to certain classes of intents and associated behaviors. Attribute dictionary 150 may serve as a schema repository of different attributes, network policy elements, or identifiers that can be used for network policy authoring and other functions within network policy architecture 105. Attribute store 155 may provide the attribute namespace or names for the compiled network policy structure to dynamic network policy logic 115.

Each of these logical components will now be addressed in more detail as follows. Turning first to authoring logic 120, provided is an input interface that obtains network policy structures from external users/systems for network policy architecture 105. One example is an intent-based network policy interface that allows a user to author an intent-based network policy as input to network policy architecture 105. Authoring logic 120 may obtain intent-based network policies via a built-in Graphical User Interface (GUI). Authoring logic 120 may also obtain network policy structures, via an Application Programming Interface (API) that can be interfaced with one or more network policy management tools, from other network policy repositories and perform a schematic translation to an attribute-based format that can be consumed/processed/understood by network policy architecture 105. In other words, authoring logic 120 may act as an attributes-based internal network policy format translator. Authoring logic 120 may serve as an input interface into network policy architecture 105, since network policy architecture 105 may translate/distribute input network policies as required for one or more target domains/environments.

Distributor logic 125 may act as an output interface for network policy architecture 105. In particular, distributor logic 125 may obtain the compiled network policy structures from dynamic network policy logic 115 and distribute the compiled network policy structures to network policy enforcement points 110. Distributor logic 125 may perform a schematic translation from the attribute-based network policy format used by network policy architecture 105 to the given network policy format compatible with network policy enforcement points 110 (e.g., JavaScript Object Notation (JSON), Command Line Interface (CLI), etc.). Thus, dynamic network policy logic 115 may provide an indication of a network policy to network policy enforcement points 110 via distributor logic 125. In one example, providing the network policy to network policy enforcement points 110 may include providing the network policy to one or more network nodes configured to enforce the network policy. For instance, network policy enforcement points 110 may distribute/instantiate the network policy at the one or more network nodes, or the network policy enforcement points 110 may comprise the one or more network nodes.

Resolver logic 130 may provide additional information obtained from outside network policy architecture 105 to dynamic network policy logic 115. For example, when translating on-premise network policies to cloud-based network policies, dynamic network policy logic 115 may utilize additional information regarding how the on-premise workload was moved into the cloud environment. This information may not be present in the input network policy structures, but may nonetheless be used to arrive at a functionally correct output network policy format that should be enforced for similar enforcement across different network policy environments. Hence, resolver logic 130 may dynamically obtain/resolve data and provide it to dynamic network policy logic 115.

Event logic 135 may collect network events and provide them to dynamic network policy logic 115. Examples of network events include a firewall disappearing from a network, a change in a mapping between an IP address and a user name, a software upgrade that occurred on a particular server, etc. Dynamic network policy logic 115 network events may dynamically generate/update network policies based on a change in the network conditions as reported by event logic 135. Event logic 135 may thus serve as a network/environment visibility layer for network policy architecture 105.

Observer logic 140 may monitor the output of distributor logic 125, correlate the output with the actual network policy enforcement by network policy enforcement points 110, and provide a feedback interface to dynamic network policy logic 115. Observer logic 140 may thus observe any differences in the output of distributor logic 125 and enforcement by network policy enforcement points 110. Observer logic 140 may also obtain user-provided feedback in addition to automated feedback. Dynamic network policy logic 115 may use such feedback for further action and decision-making. One use case for observer logic 140 may be to validate that network policies are causing the intended behavior.

Another use case for observer logic 140 relates to network policy inference, which may involve utilizing the observed data to discover unknown network policies that are being enforced by network policy enforcements points 110. This may be used to discover additional network policy enforcement points and corresponding enforced network policies. Thus, in one example, dynamic network policy logic 115 may obtain, from observer logic 140, an indication of how network traffic is being handled. Based on that indication, dynamic network policy logic 115 may determine whether one or more unknown network policies control how the network traffic is handled. If dynamic network policy logic 115 determines that the one or more unknown network policies control how the network traffic is handled, dynamic network policy logic 115 may identify the one or more unknown network policies.

Intent store 145 may obtain information relating to the guardrails from authoring logic 120 and provide that information to dynamic network policy logic 115. Dynamic network policy logic 115 may in turn use the guardrails as guides for generating network policies. For example, intent store 145 may store intents relating to compliance and/or remediation for the network policies. Based on measurements of the underlying system configuration and operational mode, dynamic network policy logic 115 may use the guardrails to modify existing network policies or add new changes to network policy architecture 105. Guardrails may also be configured to block or remediate violating network policies. A guardrail may be tagged/categorized (e.g., by authoring logic 120) as an equivalence guardrail, a compliance guardrail, or a remediation guardrail.

An equivalence guardrail may cause dynamic network policy logic 115 to perform network policy equivalence operations to ensure that two or more network policies are indeed equivalent. In one example, dynamic network policy logic 115 may compile a single intent-based network policy and distribute the network policy to two or more different network environments. Dynamic network policy logic 115 may use the equivalence guardrail to perform a reverse analysis of the distributed network policy constructs to prove that the same intent-based network policy is satisfied for all the different network environments.

In another example, one or more network policies may be generated by dynamic network policy logic 115 while other network policies may originate external to network policy architecture 105 (e.g., a legacy network policy). One example use case may include proving that a workload that has moved from one network environment to another is indeed being protected in the same manner with the same security assurance as previously. In this case, dynamic network policy logic 115 may use the equivalence guardrail to prove that the two network policies in the source and destination workload environments are indeed providing the same protection.

In yet another example, a particular network enforcement device/service that is configured with a given set of network policies may be replaced by a different but similarly capable network enforcement device/service. For example, a product may be replaced by a more recent version of the same product, or a security manager/application itself may move to a different environment (e.g., from on-premise to the cloud). In such cases, the equivalence guardrail may enable the user to determine whether the new network enforcement device/service is providing the same level of protection as the replaced network enforcement device/service.

Thus, the equivalence guardrail may be used to show that two apparently different higher-level intent-based network policies are indeed equivalent when enforced at the network/device level. For example, one network policy may state that a given set of IP addresses should be blocked for a given type of network traffic, and another network policy may state that application servers with a given patch level should be blocked for a given type of network traffic. Though these are seemingly different network policies, dynamic network policy logic 115 may determine, based on the equivalence guardrail, that the membership sets of the network policies are the same at any given point in time, and thus the network policies are effectively the same given the particular network topology and patch levels at any given point in time. In this example, the equivalence guardrail may assure the user that an aspect of a network policy is indeed being enforced.

Dynamic network policy logic 115 may translate one or more lower-level attributes of a first network policy to one or more higher-level attributes of the first network policy, and may further translate one or more lower-level attributes of a second network policy to one or more higher-level attributes of the second network policy. The first network policy may control how first network traffic is handled (e.g., in a first network environment), and the second network policy may control how second network traffic in handled (e.g., in a second network environment). Dynamic network policy logic 115 may compare the one or more higher-level attributes of the first network policy with the one or more higher-level attributes of the second network policy and, based on the comparing, determine whether the first network traffic and the second network traffic are handled in a functionally equivalent manner (e.g., in the first and second network environments). If not, dynamic network policy logic 115 may dynamically update the first network policy to generate an updated first network policy that causes the first network traffic to be handled in the functionally equivalent manner. If so, dynamic network policy logic 115 may provide an indication of the first network policy to network policy enforcement points 110 to instantiate the first network policy (e.g., in the first network environment).

The equivalence guardrail may enable dynamic network policy logic 115 to perform a "reverse analysis" whereby dynamic network policy logic 115 translates lower-level attributes to higher-level attributes. That is, dynamic network policy logic 115 may be configured to perform a "forward analysis" that involves translating higher-level attributes from intent-based network policies to lower-level attributes for network policy enforcement points 110. In the "reverse analysis" case, dynamic network policy logic 115 translates lower-level attributes from enforceable network policy constructs that have been distributed or enforced in the network to higher-level attributes that may be used to compare whether the network policies are enforced in a functionally equivalent manner. For example, dynamic network policy logic 115 may ensure that the existing network policy of a particular enforcement device in the network (e.g., ACLs which have been configured in a firewall) are functionally equivalent to a different network policy.

The reverse analysis may be performed through any suitable mechanism. In one example, dynamic network policy logic 115 may determine that the one or more higher-level attributes of a network policy comprises a group including one or more lower-level attributes of the first network policy. This may be accomplished using a mix of similarity/closeness analysis on a set of lower-level attributes (e.g., for both names and values of attributes) to identify a reduced number of higher-level attributes. This process may use information obtained from external entities (e.g., attribute dictionary 150 may indicate that a particular group of user identity attributes is indeed a higher level attribute of finance-team). Dynamic network policy logic 115 may apply this process multiple times and possibly recursively (e.g., on the generated set of intermediate-level attributes) until a sufficiently reduced number of higher-level attributes have been identified. Dynamic network policy logic 115 may thus discover a newer network policy that is now expressed as a newer set of higher-level attributes, but was derived from the lower-level network policy that was actually enforced.

For instance, consider a set of ACLs that were enforced at the network level. Dynamic network policy logic 115 may perform reverse analysis by start with the ACL-level information (e.g., network tuples) and apply different groups on those set of lower-level attributes to discover with higher-level attribute/grouping (e.g., mapping a set of IP addresses in a single subnetwork, a group of users to a single team, a set of IP addresses to a set of applications at a single patch level, etc.).

In another example, dynamic network policy logic 115 may determine that the one or more lower-level attributes of the first network policy are semantically mapped to the one or more higher-level attributes of the first network policy. For instance, dynamic network policy logic 115 may perform reverse analysis using semantic mapping relationship information. In one specific example, if a mapping indicates that higher-level attributes A1 and A2 map to lower-level attributes B1, B2, and B3, then if B1, B2, and B3 are observed, A1 and A2 may be the corresponding higher-level attributes (though there may be other possibilities).

The "group" or "semantic mapping" mechanisms may be examples of reverse analysis that enable dynamic network policy logic 115 to reach a more succinct, higher-level set of attributes that can be inferred to result in the network policies that were applied in given network. When this process is applied over a large and varied set of network policies, dynamic network policy logic 115 may determine with high confidence that the underlying network policies satisfy the same higher-level intent because the same set of higher-level attributes was produced. Thus, the process may prove that different sets of lower-level network policies are indeed functionally equivalent.

A compliance guardrail may include capture guidelines and desired conditions that cause dynamic network policy logic 115 to perform operations that reflect certain business/global conditions. In one example, a compliance guardrail may include an indication of a global condition for the first network policy. A global condition may be a condition that may potentially apply to multiple network policies. One example of a compliance guardrail may be the requirement that data transferred from a network must be encrypted. Another example of a compliance guardrail may be the requirement that all communications to/from specific network resources must be logged and tracked. A compliance guardrail may enable dynamic network policy logic 115 to obtain an indication of a global condition for a network policy and generate the network policy based on the indication of the global condition.

A remediation guardrail may dictate corrective actions for the underlying system based on certain environmental or threat postures. Thus, a remediation guardrail may ensure that an indication of a corrective action to be enforced by a network policy is, in fact, enforced. One example of a remediation guardrail may be the requirement to block communication to/from certain critical parts of the network in the event of a widespread malware outage. A remediation guardrail may enable dynamic network policy logic 115 to obtain an indication of a corrective action to be enforced by a network policy and generate the network policy based on the indication. Remediation guardrails may take priority when an environmental condition is active.

Attribute dictionary 150 may be organized by name-space based on different sources of attribute information as well as the network policy decision and enforcement realms. For example, attributes from an identity management service and a malware protection service may exist in different dictionary namespaces because they originate from different sources. Dynamic network policy logic 115 may use these attributes together to define or compile a network policy structure that is applicable when the workload is executed within an on-premise environment that has the identity management service and the malware protection service, or a cloud environment that does not have the identity management service or the malware protection service but does have an equivalent functionality requiring a new namespace for these new network policy structures. In all such cases, attribute dictionary 150 may provide a place to store the namespace attributes to be used for network policy authoring or translation by, for example, dynamic network policy logic 115. All network policy structures and functions within network policy architecture 105 may be defined based on these attributes. In one example, one or more of these attributes may be lower-level attributes that serve as the fundamental building block(s) of intent-based network policy structures.

Attribute store 155 is adjunct with attribute dictionary 150 and serves as a collection of different pieces of expressed information which are available for the current network policy flow (e.g., authoring, compilation, distribution, etc.). Attribute store 155 may be interfaced with external sources of information (e.g., user, device identity, etc.).

Figure 2:
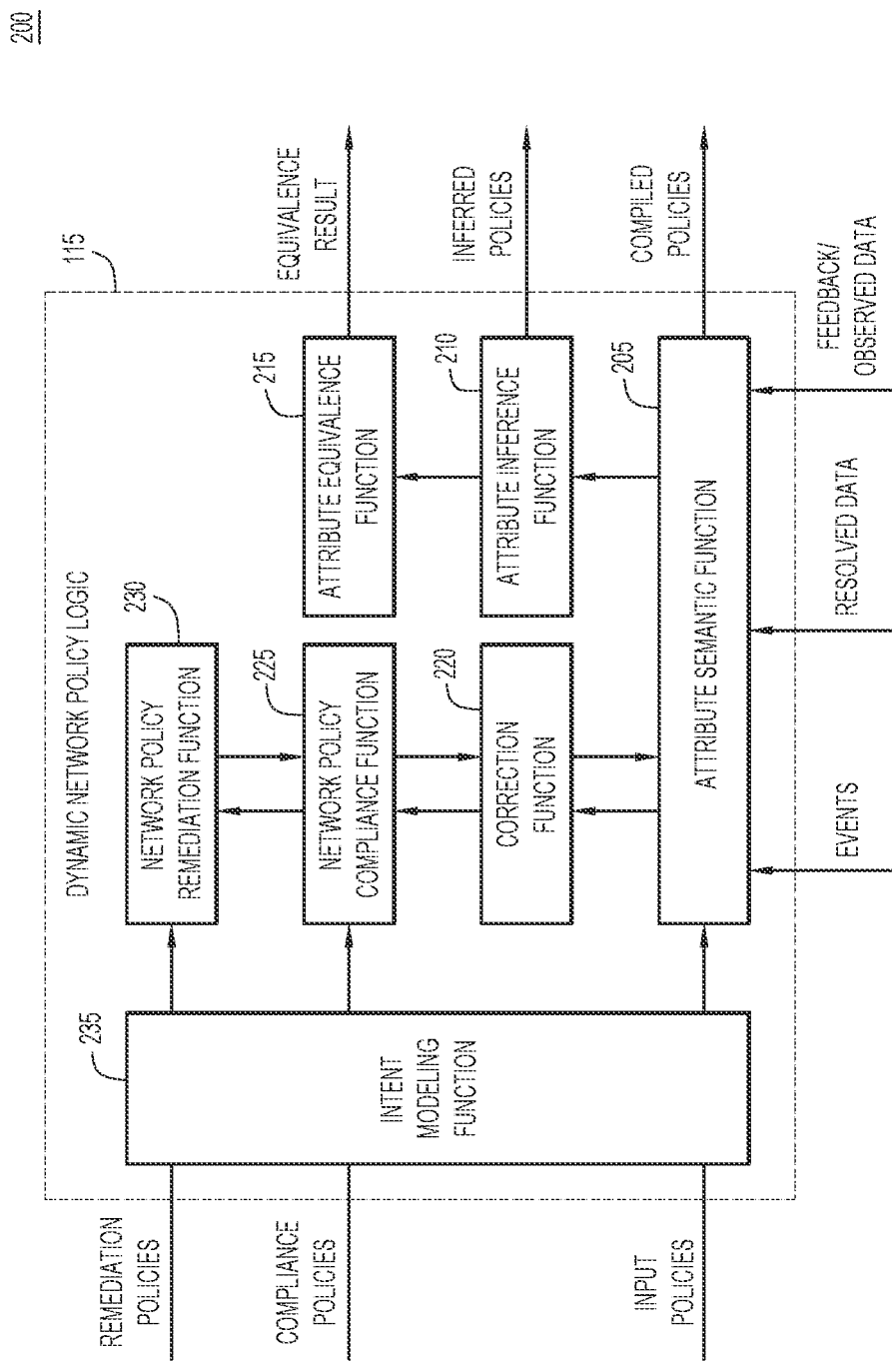
FIG. 2 illustrates a logical flow diagram for dynamically changing network policies, according to an example embodiment.

FIG. 2 illustrates a logical flow diagram 200 for dynamically changing network policies. Logical flow diagram 200 includes logical sub-components of dynamic network policy logic 115. In particular, dynamic network policy logic 115 includes attribute semantic function 205, attribute inference function 210, attribute equivalence function 215, correction function 220, network policy compliance function 225, network policy remediation function 230, and intent modeling function 235. Each of these logical sub-components is described in greater detail below.

Attribute semantic function 205 may provide a logic programming-based rules engine that translates attributes from one format to another (e.g., between namespaces/network policy domains) as driven by a set of semantic mapping rules. Attribute semantic function 205 may perform translations based on inputs obtained from one or more of authoring logic 120, resolver logic 130, event logic 135, observer logic 140, intent store 145, and attribute store 155 (e.g., network events, resolved data, and/or feedback/observed data). Attribute semantic function 205 may provide compiled network policies to distributor logic 125. Attribute semantic function 205 may also support additional plugins or modules that can provide additional functionality in addition to attribute semantic mapping capabilities.

Attribute inference function 210 may infer a summarized set of higher-level attributes/network policy definitions from a given set of lower-level attributes/enforcement network policies. Attribute inference function 210 may make these inferences based on metadata reported from attribute semantic function 205 relating to input and compiled network policies to enable learning-based inference. Attribute inference function 210 may provide the inferred higher-level attributes to one or more of authoring logic 120, distributor logic 125, resolver logic 130, event logic 135, observer logic 140, intent store 145, attribute dictionary 150, and attribute store 155.

Attribute equivalence function 215 may determine whether any two given sets of attributes in different attribute domains/namespaces are equivalent. Attribute equivalence function 215 may further establish this equivalence using any existing semantic mapping information and/or inferred higher-level attributes obtained from attribute inference function 210. Attribute inference function 210 may provide the equivalence result to one or more of authoring logic 120, distributor logic 125, resolver logic 130, event logic 135, observer logic 140, intent store 145, attribute dictionary 150, and attribute store 155.

Correction function 220 may provide hooks into the attribute semantic function 205 to correct or modify a compiled network policy. One example use case involves ensuring that the compiled network policies satisfy any compliance guardrails (e.g., enforce some tangential set of special intents or ensure global concerns are not violated). Network policy compliance function 225 uses correction function 220 to modify the compiled attributes/network policies to satisfy a set of higher-level compliance requirements. For example, network policy compliance function 225 may provide global corrections to satisfy compliance requirements.

Network policy remediation function 230 may enable a special transient time-bound capability to modify compiled network policies to respond to significant network issues (e.g., outages, attacks, etc.). For example, network policy remediation function 230 may provide transient high-priority inputs for immediate remediation based on any remediation guardrails. It will be appreciated that network policy remediation may result in incomplete network policy compilation wherein only some higher-level intent network policies are compiled, since remediation may sometimes involve avoiding use of specific network policy enforcement points.

Intent modeling function 235 may obtain various inputs and provide those inputs to other logical sub-components of dynamic network policy logic 115. For example, intent modeling function 235 may obtain input network policies, compliance network policies, and remediation network policies from one or more of authoring logic 120, resolver logic 130, event logic 135, observer logic 140, intent store 145, and attribute store 155. Intent modeling function 235 may provide input network policies to attribute semantic function 205, compliance network policies to network policy compliance function 225, and remediation network policies to network policy remediation function 230.

Figure 3:
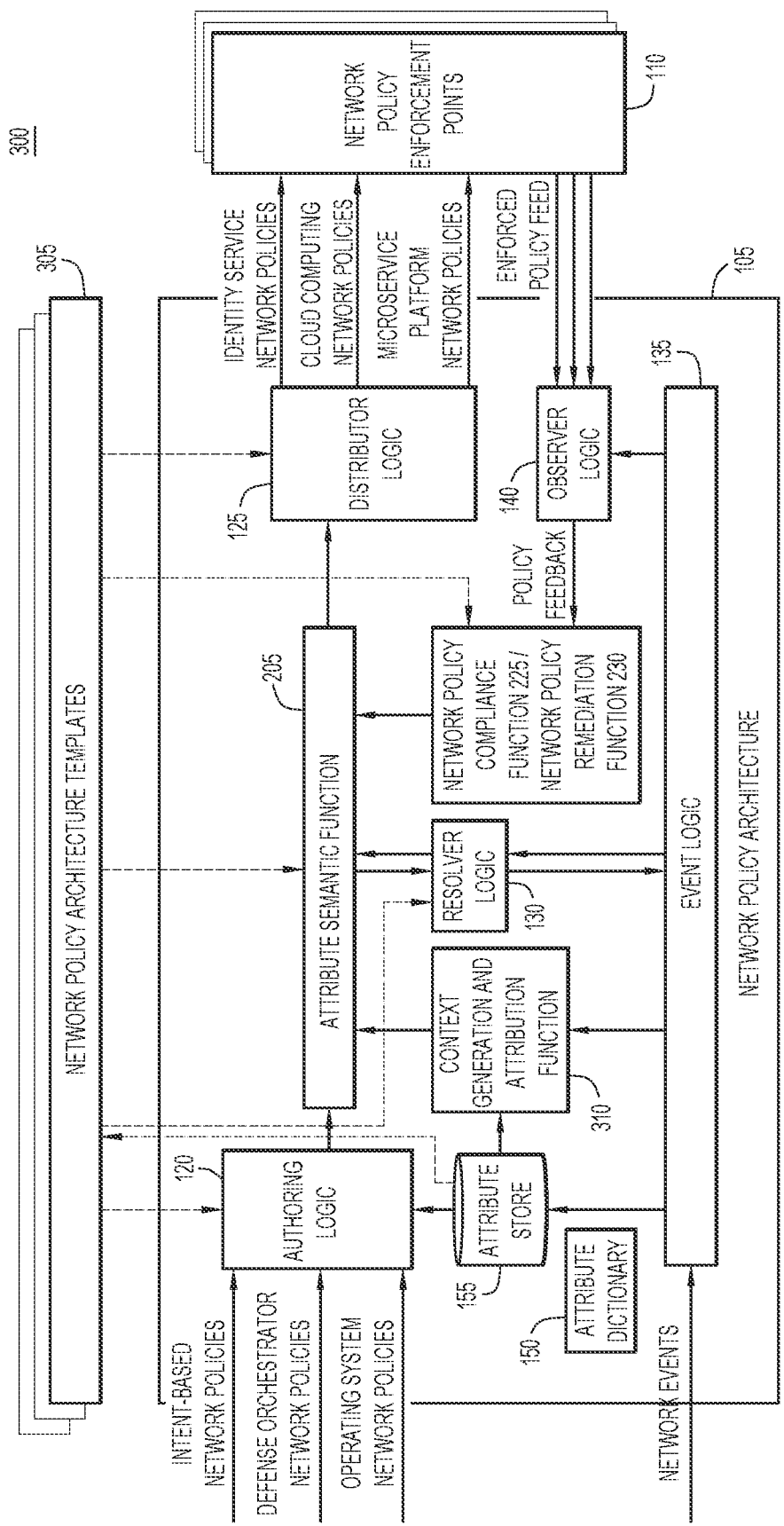
FIG. 3 illustrates a system that includes a network policy architecture configured to dynamically change network policies, according to an example embodiment.

FIG. 3 illustrates an example system 300 configured for dynamically changing network policies. System 300 includes a plurality of network policy architecture templates 305, network policy architecture 105, and network policy enforcement points 110. Network policy architecture 105 includes authoring logic 120, distributor logic 125, resolver logic 130, event logic 135, observer logic 140, attribute dictionary 150, attribute store 155, attribute semantic function 205, network policy compliance function 225, network policy remediation function 230, and context generation and attribution function 310. It will be appreciated that FIG. 3 illustrates the data flow and behavior describing the inputs, internal processing, and output of network policy architecture 105.

Each network policy architecture template 305 may correspond to a respective group of network policy enforcement points 110. For example, a first group of network policy enforcement points 110 may be associated with a first network environment/domain controlled by an identity service, a second group of network policy enforcement points 110 may be associated with a second network environment/domain controlled by a cloud computing service, and a third group of network policy enforcement points 110 may be associated with a third network environment/domain controlled by a microservice platform. The network policy architecture templates 305 may include a network policy architecture template corresponding to the first, second, and third groups of network policy enforcement points 110 to provide domain-specific configurations for network policy architecture 105.

Different network policy formats may be supported by on-demand installation of network policy architecture templates 305. For instance, network policy architecture templates 305 may automatically modify authoring logic 120, distributor logic 125, resolver logic 130, attribute semantic function 205, network policy compliance function 225, and network policy remediation function 230. Furthermore, attribute store 155 may provide attribute definitions to network policy architecture templates 305 in order to enable network policy architecture templates 305 to modify the various logical components appropriately. Network policy architecture templates 305 may drive the behavior of network policy architecture 105 by dynamically configuring logical components of network policy architecture 105 to support different input and output network policy formats and compliance/remediation requirements.

Authoring logic 120 may obtain intent-based network policies, defense orchestrator network policies, and operating system network policies. The intent-based network policies may be obtained from a user, and the defense orchestrator network policies and operating system network policies may be obtained automatically from network security systems (e.g., a defense orchestrator network security system and an operating system network security system, respectively). Authoring logic 120 may convert these network policies to an attribute-based network policy format that can be processed by attribute semantic function 205.

In this example, network policy architecture 105 may use the intent-based network policies as input to generate network policies for the first network environment/domain controlled by the identity service; network policy architecture 105 may use the defense orchestrator network policies as input to generate network policies for the second network environment/domain controlled by the cloud computing service; and network policy architecture 105 may use the operating system network policies as input to generate network policies for the third network environment/domain controlled by the microservice platform. Network policy architecture 105 may also generate the network policies based on network policy architecture templates 305 and other logical components of network policy architecture 105.

Distributor logic 125 may provide the generated network policies to respective groups of network policy enforcement points 110. For example, distributor logic 125 may provide the identity service network policies to the first group of network policy enforcement points 110 associated with the first network environment/domain controlled by the identity service; distributor logic 125 may provide the cloud computing network policies to the second group of network policy enforcement points 110 associated with the second network environment/domain controlled by the cloud computing service; and distributor logic 125 may provide the third group of network policy enforcement points 110 associated with the third network environment/domain controlled by the microservice platform.

Event logic 135 may obtain network events and provide feedback to various logical components of network policy architecture 105. For example, event logic 135 may provide an indication of network events to attribute store 155 for attribute discovery and namespace attribution. This may enable attribute store 155 to provide attribute vocabulary to authoring logic 120, network policy architecture templates 305, and/or context generation and attribution function 310. Event logic 135 may also provide a network event feed to context generation and attribution function 310, which may generate a unified context to attribute semantic function 205 based on the network event feed and the attribute vocabulary obtained from attribute store 155. Event logic 135 may further provide an indication of network events to resolver logic 130 to look up and identify any missing attributes. Event logic 135 may also provide network policy enforcement results to observer logic 140.

Attribute semantic function 205 may obtain an indication of the appropriate network policy architecture template(s) from network policy architecture templates 305, the received network policies in an attribute-based network policy format from authoring logic 120, the unified context from context generation and attribution function 310, and an indication of any missing attributes from resolver logic 130. Based on this information, attribute semantic function 205 may generate the identity service network policies, cloud computing service network policies, and microservice platform network policies. Attribute semantic function 205 may provide these network policies to distributor logic 125 for instantiation at one or more of network policy enforcement points 110.

Observer logic 140 may obtain an enforced network policy feed from network policy enforcement points 110. Based on the enforced network policy feed and the network policy enforcement results obtained from event logic 135, observer logic 140 may provide network policy feedback to network policy compliance function 225 and/or network policy remediation function 230. Network policy compliance function 225 and/or network policy remediation function 230 may generate any network policy corrections and provide the network policy corrections to attribute semantic function 205. Attribute semantic function 205 may dynamically update the network policies based on the network policy corrections (e.g., compliance and remediation guardrails) and/or one or more equivalence guardrails.

FIG. 4 illustrates a hardware block diagram of an example device 400 configured to dynamically change network policies. It should be appreciated that FIG. 4 provides only an illustration of one embodiment and does not imply any limitations with regard to the environments in which different embodiments may be implemented. Many modifications to the depicted environment may be made.

As depicted, the device 400 includes a bus 412, which provides communications between computer processor(s) 414, memory 416, persistent storage 418, communications unit 420, and Input/Output (I/O) interface(s) 422. Bus 412 can be implemented with any architecture designed for passing data and/or control information between processors (such as microprocessors, communications and network processors, etc.), system memory, peripheral devices, and any other hardware components within a system. For example, bus 412 can be implemented with one or more buses.

Memory 416 and persistent storage 418 are computer readable storage media. In the depicted embodiment, memory 416 includes Random Access Memory (RAM) 424 and cache memory 426. In general, memory 416 can include any suitable volatile or non-volatile computer readable storage media. Instructions for dynamic network policy logic 115 may be stored in memory 416 or persistent storage 418 for execution by computer processor(s) 414.

One or more programs may be stored in persistent storage 418 for execution by one or more of the respective computer processors 414 via one or more memories of memory 416. The persistent storage 418 may be a magnetic hard disk drive, a solid state hard drive, a semiconductor storage device, Read-Only Memory (ROM), Erasable Programmable ROM (EPROM), Flash memory, or any other computer readable storage media that is capable of storing program instructions or digital information.

The media used by persistent storage 418 may also be removable. For example, a removable hard drive may be used for persistent storage 418. Other examples include optical and magnetic disks, thumb drives, and smart cards that are inserted into a drive for transfer onto another computer readable storage medium that is also part of persistent storage 418.

Communications unit 420, in these examples, provides for communications with other data processing systems or devices. In these examples, communications unit 420 includes one or more network interface cards. Communications unit 420 may provide communications through the use of either or both physical and wireless communications links.

I/O interface(s) 422 allows for input and output of data with other devices that may be connected to device 400. For example, I/O interface(s) 422 may provide a connection to external devices 428 such as a keyboard, keypad, a touch screen, and/or some other suitable input device. External devices 428 can also include portable computer readable storage media such as database systems, thumb drives, portable optical or magnetic disks, and memory cards.

Software and data used to practice embodiments can be stored on such portable computer readable storage media and can be loaded onto persistent storage 418 via I/O interface(s) 422. I/O interface(s) 422 may also connect to a display 430. Display 430 provides a mechanism to display data to a user and may be, for example, a computer monitor.

FIG. 5 is a flowchart of an example method 500 for dynamically changing network policies. In this example, device 400 performs method 500. At 510, device 400 translates one or more lower-level attributes of a first network policy to one or more higher-level attributes of the first network policy, wherein the first network policy controls how first network traffic is handled. At 520, device 400 translates one or more lower-level attributes of a second network policy to one or more higher-level attributes of the second network policy, wherein the second network policy controls how second network traffic is handled. At 530, device 400 compares the one or more higher-level attributes of the first network policy with the one or more higher-level attributes of the second network policy. At 540, based on the comparing, device 400 determines whether the first network traffic and the second network traffic are handled in a functionally equivalent manner. At 550, if it is determined that the first network traffic and the second network traffic are not handled in a functionally equivalent manner, device 400 dynamically updates the first network policy to generate an updated first network policy that causes the first network traffic to be handled in the functionally equivalent manner.

Described herein is a network policy architecture may dynamically react and adapt to intent-based network policies, subject to compliance and remediation guardrails, with provable assurance of network policy equivalence across different domains on a continuous basis. This enables end-to-end, automated, and dynamic network policy management that satisfies contextual conditions such as compliance and remediation. Core network policy architecture functions may be adapted based on various networking, contextual, compliance, or environmental changes which may prompt a modification to the network policy pushed to the network policy enforcement layer. The compliance, equivalence, and remediation guardrails may adapt network policy changes over the underlying system. The guardrails may be authored as intents and tagged accordingly.

The network policy architecture may translate attributes from one namespace (domain) to another. This translation may be performed via a set of semantic mapping relationships. The semantic mapping relationships may be defined based on a set of rules which dictate the mapping relationships. Additionally/alternatively, the semantic mapping relationships may be learned based on appropriate user feedback. The learning may be based on a first stage involving an automated similarity analysis between the higher-level attributes (e.g., attribute names) and the lower-level attributes (e.g., values) and a second stage involving improving the results based on feedback obtained from a user to validate or correct the learning.

Network policy ingestion may be provided from a variety of authoring, translation, and distribution interfaces to a variety of network policy enforcement points. The network policy architecture may also support the ability to provide a capability-based representation of different network policy enforcement points available in the network. Such a network policy enforcement capability may be expressed as a set of attribute-based structures, within a suitable device-specific or a normalized namespace. An attribute-based interface may be supported throughout the network policy architecture, for the various input and output interfaces as well as any inter-component processing.

The network policy architecture may support intent-based network policy authoring, where the definition of the intent can be designed and changed by the user. Thus, a user may author network policies using pre-defined intent semantics or by defining new semantics to better match user expectations. Furthermore, feedback may be obtained from external sources regarding the efficacy of the functions of the network policy architecture. This may include user-level feedback regarding whether the network policy enforcement appears consistent with the intended intent or any enforcement-point related feedback/error response that may indicate issues related to proper network policy enforcement.

A mapping may be defined and accepted between a given intent definition and an expected network policy structure for enforcement. Such a mapping may be obtained from a network policy modelling agent (e.g., an administrator who is configuring multiple network policy devices to work together), or may be learnt from existing mappings to similar sets of network policy enforcement points.

A template-based approach may be utilized to define the behavior of the core network policy architecture components. This may enable data template-driven techniques for configuring different components such as authoring, resolution, compilation, and distribution as well as their inter-processing capabilities to eventually define the behavior of the overall network policy architecture. Thus, it may be possible to modify or adapt the network policy architecture functionality by changing the current template.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., GUI, command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, Compact Disc ROM (CD-ROM), Digital Versatile Disk (DVD), memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The system may employ any number of any conventional or other databases, data stores or storage structures (e.g., files, databases, data structures, data or other repositories, etc.) to store information. The database system may be implemented by any number of any conventional or other databases, data stores or storage structures to store information. The database system may be included within or coupled to the server and/or client systems. The database systems and/or storage structures may be remote from or local to the computer or other processing systems, and may store any desired data.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, EPROM, Flash memory, a Static RAM (SRAM), a portable CD-ROM, a DVD, a memory stick, a floppy disk, a mechanically encoded device, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a LAN, a WAN, and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, Instruction-Set-Architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, Field-Programmable Gate Arrays (FPGA), or Programmable Logic Arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In one form, a method is provided. The method comprises: translating one or more lower-level attributes of a first network policy to one or more higher-level attributes of the first network policy, wherein the first network policy controls how first network traffic is handled; translating one or more lower-level attributes of a second network policy to one or more higher-level attributes of the second network policy, wherein the second network policy controls how second network traffic is handled; comparing the one or more higher-level attributes of the first network policy with the one or more higher-level attributes of the second network policy; based on the comparing, determining whether the first network traffic and the second network traffic are handled in a functionally equivalent manner; and if it is determined that the first network traffic and the second network traffic are not handled in a functionally equivalent manner, dynamically updating the first network policy to generate an updated first network policy that causes the first network traffic to be handled in the functionally equivalent manner.

In one example, the method further comprises: if it is determined that the first network traffic and the second network traffic are handled in a functionally equivalent manner, providing an indication of the first network policy to one or more network policy enforcement points that instantiate the first network policy. In a further example, providing the indication of the first network policy to the one or more network policy enforcement points includes providing the first network policy to one or more network nodes configured to enforce the first network policy.

In one example, translating the one or more lower-level attributes of the first network policy to the one or more higher-level attributes of the first network policy includes determining that the one or more higher-level attributes of the first network policy comprises a group including the one or more lower-level attributes of the first network policy; and translating the one or more lower-level attributes of the second network policy to the one or more higher-level attributes of the second network policy includes determining that the one or more higher-level attributes of the second network policy comprises a group including the one or more lower-level attributes of the second network policy.

In one example, translating the one or more lower-level attributes of the first network policy to the one or more higher-level attributes of the first network policy includes determining that the one or more lower-level attributes of the first network policy are semantically mapped to the one or more higher-level attributes of the first network policy; and translating the one or more lower-level attributes of the second network policy to the one or more higher-level attributes of the second network policy includes determining that the one or more lower-level attributes of the second network policy are semantically mapped to the one or more higher-level attributes of the second network policy.

In one example, the method further comprises: obtaining an indication of a global condition for the first network policy; and generating the first network policy based on the indication of the global condition for the first network policy.

In one example, the method further comprises: obtaining an indication of a corrective action to be enforced by the first network policy; and generating the first network policy based on the indication of the corrective action to be enforced by the first network policy.

In one example, the method further comprises: obtaining an indication of how the first network traffic is being handled; based on the indication of how the first network traffic is being handled, determining whether one or more unknown network policies control how the first network traffic is handled; and if it is determined that the one or more unknown network policies control how the first network traffic is handled, identifying the one or more unknown network policies.

In another form, an apparatus is provided. The apparatus comprises: a network interface configured to provide and/or obtain network communications; and one or more processors coupled to the network interface, wherein the one or more processors are configured to: translate one or more lower-level attributes of a first network policy to one or more higher-level attributes of the first network policy, wherein the first network policy controls how first network traffic is handled; translate one or more lower-level attributes of a second network policy to one or more higher-level attributes of the second network policy, wherein the second network policy controls how second network traffic is handled; compare the one or more higher-level attributes of the first network policy with the one or more higher-level attributes of the second network policy; based on the comparison, determine whether the first network traffic and the second network traffic are handled in a functionally equivalent manner; and if it is determined that the first network traffic and the second network traffic are not handled in a functionally equivalent manner, dynamically update the first network policy to generate an updated first network policy that causes the first network traffic to be handled in the functionally equivalent manner.

In another form, one or more non-transitory computer readable storage media are provided. The non-transitory computer readable storage media are encoded with instructions that, when executed by a processor, cause the processor to: translate one or more lower-level attributes of a first network policy to one or more higher-level attributes of the first network policy, wherein the first network policy controls how first network traffic is handled; translate one or more lower-level attributes of a second network policy to one or more higher-level attributes of the second network policy, wherein the second network policy controls how second network traffic is handled; compare the one or more higher-level attributes of the first network policy with the one or more higher-level attributes of the second network policy; based on the comparison, determine whether the first network traffic and the second network traffic are handled in a functionally equivalent manner; and if it is determined that the first network traffic and the second network traffic are not handled in a functionally equivalent manner, dynamically update the first network policy to generate an updated first network policy that causes the first network traffic to be handled in the functionally equivalent manner.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   translating one or more lower-level attributes of a first network policy to one or more higher-level attributes of the first network policy, wherein the first network policy controls how first network traffic is handled;
   translating one or more lower-level attributes of a second network policy to one or more higher-level attributes of the second network policy, wherein the second network policy controls how second network traffic is handled;
   comparing the one or more higher-level attributes of the first network policy with the one or more higher-level attributes of the second network policy;
   based on the comparing, determining whether the first network traffic and the second network traffic are handled in a functionally equivalent manner;
   if it is determined that the first network traffic and the second network traffic are not handled in the functionally equivalent manner, dynamically updating the first network policy to generate an updated first network policy that causes the first network traffic to be handled in the functionally equivalent manner;
   obtaining an indication of how the first network traffic is being handled;
   based on the indication of how the first network traffic is being handled, determining that one or more unknown network policies control how the first network traffic is handled; and
   in response to determining that the one or more unknown network policies control how the first network traffic is handled, identifying the one or more unknown network policies.

2. The method of claim 1, further comprising:
   if it is determined that the first network traffic and the second network traffic are handled in the functionally equivalent manner, providing an indication of the first network policy to one or more network policy enforcement points that instantiate the first network policy.

3. The method of claim 2, wherein providing the indication of the first network policy to the one or more network policy enforcement points includes providing the indication of the first network policy to one or more network nodes configured to enforce the first network policy.

4. The method of claim 1, wherein:
   translating the one or more lower-level attributes of the first network policy to the one or more higher-level attributes of the first network policy includes determining that the one or more higher-level attributes of the first network policy comprises a group including the one or more lower-level attributes of the first network policy; and translating the one or more lower-level attributes of the second network policy to the one or more higher-level attributes of the second network policy includes determining that the one or more higher-level attributes of the second network policy comprises a group including the one or more lower-level attributes of the second network policy.

5. The method of claim 1, wherein:
translating the one or more lower-level attributes of the first network policy to the one or more higher-level attributes of the first network policy includes determining that the one or more lower-level attributes of the first network policy are semantically mapped to the one or more higher-level attributes of the first network policy; and
translating the one or more lower-level attributes of the second network policy to the one or more higher-level attributes of the second network policy includes determining that the one or more lower-level attributes of the second network policy are semantically mapped to the one or more higher-level attributes of the second network policy.

6. The method of claim 1, further comprising:
obtaining an indication of a global condition for the first network policy; and
generating the first network policy based on the indication of the global condition for the first network policy.

7. The method of claim 1, further comprising:
obtaining an indication of a corrective action to be enforced by the first network policy; and
generating the first network policy based on the indication of the corrective action to be enforced by the first network policy.

8. An apparatus comprising:
a network interface configured to provide and/or obtain network communications; and
one or more processors coupled to the network interface, wherein the one or more processors are configured to:
translate one or more lower-level attributes of a first network policy to one or more higher-level attributes of the first network policy, wherein the first network policy controls how first network traffic is handled;
translate one or more lower-level attributes of a second network policy to one or more higher-level attributes of the second network policy, wherein the second network policy controls how second network traffic is handled;
compare the one or more higher-level attributes of the first network policy with the one or more higher-level attributes of the second network policy;
based on the compare, determine whether the first network traffic and the second network traffic are handled in a functionally equivalent manner;
if it is determined that the first network traffic and the second network traffic are not handled in the functionally equivalent manner, dynamically update the first network policy to generate an updated first network policy that causes the first network traffic to be handled in the functionally equivalent manner;
obtain an indication of how the first network traffic is being handled;
based on the indication of how the first network traffic is being handled, determine that one or more unknown network policies control how the first network traffic is handled; and
in response to determining that the one or more unknown network policies control how the first network traffic is handled, identify the one or more unknown network policies.

9. The apparatus of claim 8, wherein the one or more processors are further configured to:
if it is determined that the first network traffic and the second network traffic are handled in the functionally equivalent manner, provide an indication of the first network policy to one or more network policy enforcement points that instantiate the first network policy.

10. The apparatus of claim 9, wherein the one or more processors are configured to:
provide the indication of the first network policy to one or more network nodes configured to enforce the first network policy.

11. The apparatus of claim 8, wherein the one or more processors are further configured to:
determine that the one or more higher-level attributes of the first network policy comprises a group including the one or more lower-level attributes of the first network policy; and
determine that the one or more higher-level attributes of the second network policy comprises a group including the one or more lower-level attributes of the second network policy.

12. The apparatus of claim 8, wherein the one or more processors are further configured to:
determine that the one or more lower-level attributes of the first network policy are semantically mapped to the one or more higher-level attributes of the first network policy; and
determine that the one or more lower-level attributes of the second network policy are semantically mapped to the one or more higher-level attributes of the second network policy.

13. The apparatus of claim 8, wherein the one or more processors are further configured to:
obtain an indication of a global condition for the first network policy; and
generate the first network policy based on the indication of the global condition for the first network policy.

14. The apparatus of claim 8, wherein the one or more processors are further configured to:
obtain an indication of a corrective action to be enforced by the first network policy; and
generate the first network policy based on the indication of the corrective action to be enforced by the first network policy.

15. One or more non-transitory computer readable storage media encoded with instructions that, when executed by a processor, cause the processor to:
translate one or more lower-level attributes of a first network policy to one or more higher-level attributes of the first network policy, wherein the first network policy controls how first network traffic is handled;
translate one or more lower-level attributes of a second network policy to one or more higher-level attributes of the second network policy, wherein the second network policy controls how second network traffic is handled;
compare the one or more higher-level attributes of the first network policy with the one or more higher-level attributes of the second network policy;
based on the comparison, determine whether the first network traffic and the second network traffic are handled in a functionally equivalent manner;
if it is determined that the first network traffic and the second network traffic are not handled in the functionally equivalent manner, dynamically update the first network policy to generate an updated first network policy that causes the first network traffic to be handled in the functionally equivalent manner;

obtain an indication of how the first network traffic is being handled;

based on the indication of how the first network traffic is being handled, determine that one or more unknown network policies control how the first network traffic is handled; and in response to determining that the one or more unknown network policies control how the first network traffic is handled, identify the one or more unknown network policies.

16. The one or more non-transitory computer readable storage media of claim 15, wherein the instructions further cause the processor to:

determine that the one or more higher-level attributes of the first network policy comprises a group including the one or more lower-level attributes of the first network policy; and determine that the one or more higher-level attributes of the second network policy comprises a group including the one or more lower-level attributes of the second network policy.

17. The one or more non-transitory computer readable storage media of claim 15, wherein the instructions further cause the processor to:

determine that the one or more lower-level attributes of the first network policy are semantically mapped to the one or more higher-level attributes of the first network policy; and determine that the one or more lower-level attributes of the second network policy are semantically mapped to the one or more higher-level attributes of the second network policy.

18. The one or more non-transitory computer readable storage media of claim 15, wherein the instructions further cause the processor to:

if it is determined that the first network traffic and the second network traffic are handled in the functionally equivalent manner, provide an indication of the first network policy to one or more network nodes configured to enforce the first network policy.

19. The one or more non-transitory computer readable storage media of claim 15, wherein the instructions further cause the processor to:

obtain an indication of a global condition for the first network policy; and generate the first network policy based on the indication of the global condition for the first network policy.

20. The one or more non-transitory computer readable storage media of claim 15, wherein the instructions further cause the processor to:

obtain an indication of a corrective action to be enforced by the first network policy; and generate the first network policy based on the indication of the corrective action to be enforced by the first network policy.

* * * * *